A. C. DENNIS.
MATERIAL LOADING MACHINE.
APPLICATION FILED APR. 7, 1920.
1,398,365.
Patented Nov. 29, 1921.
5 SHEETS—SHEET 3.
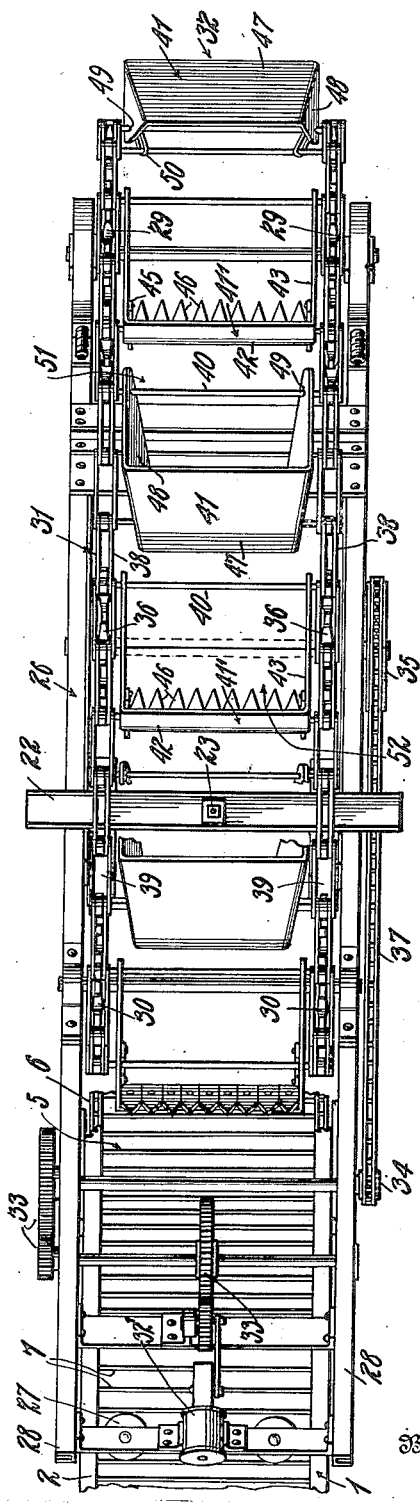
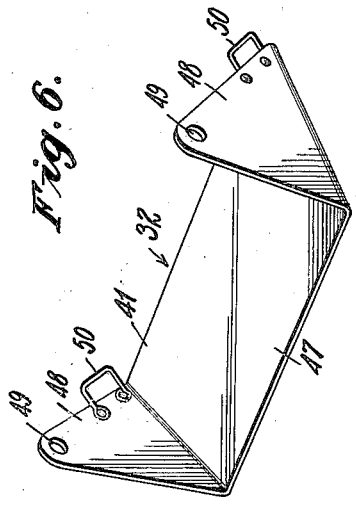
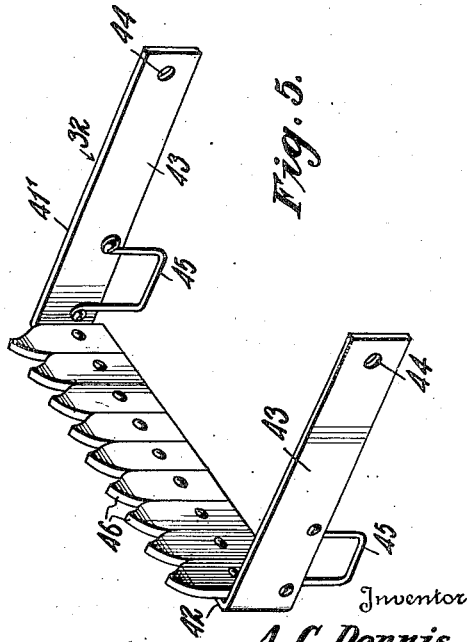
Inventor
A. C. Dennis

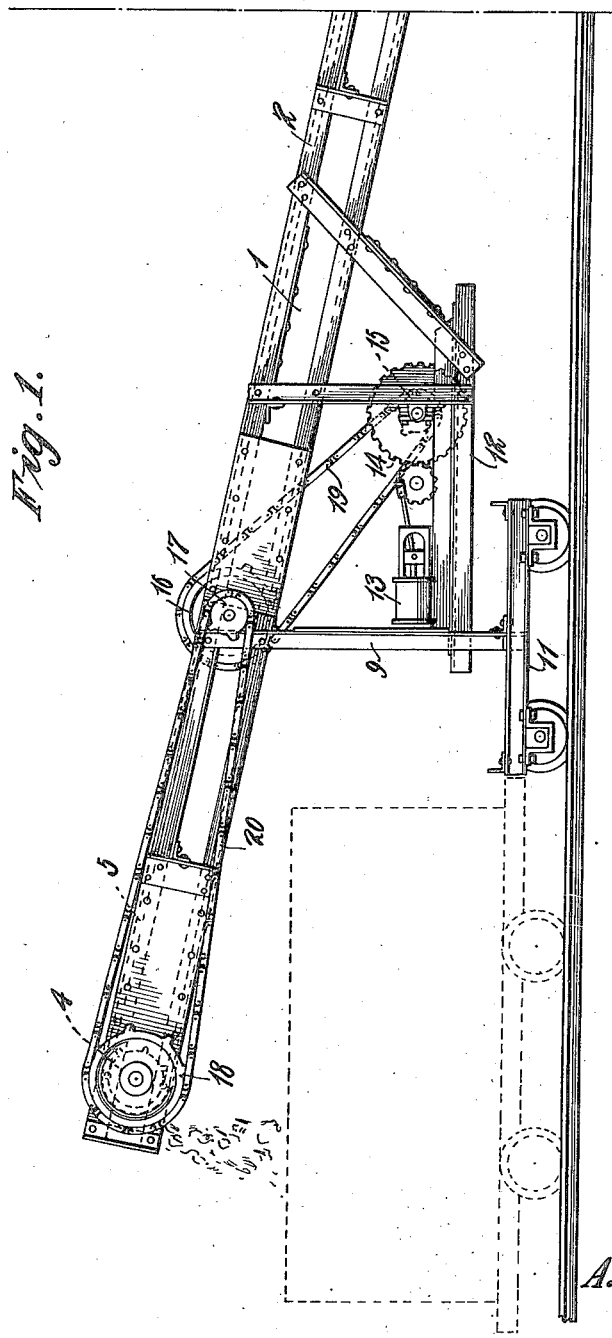

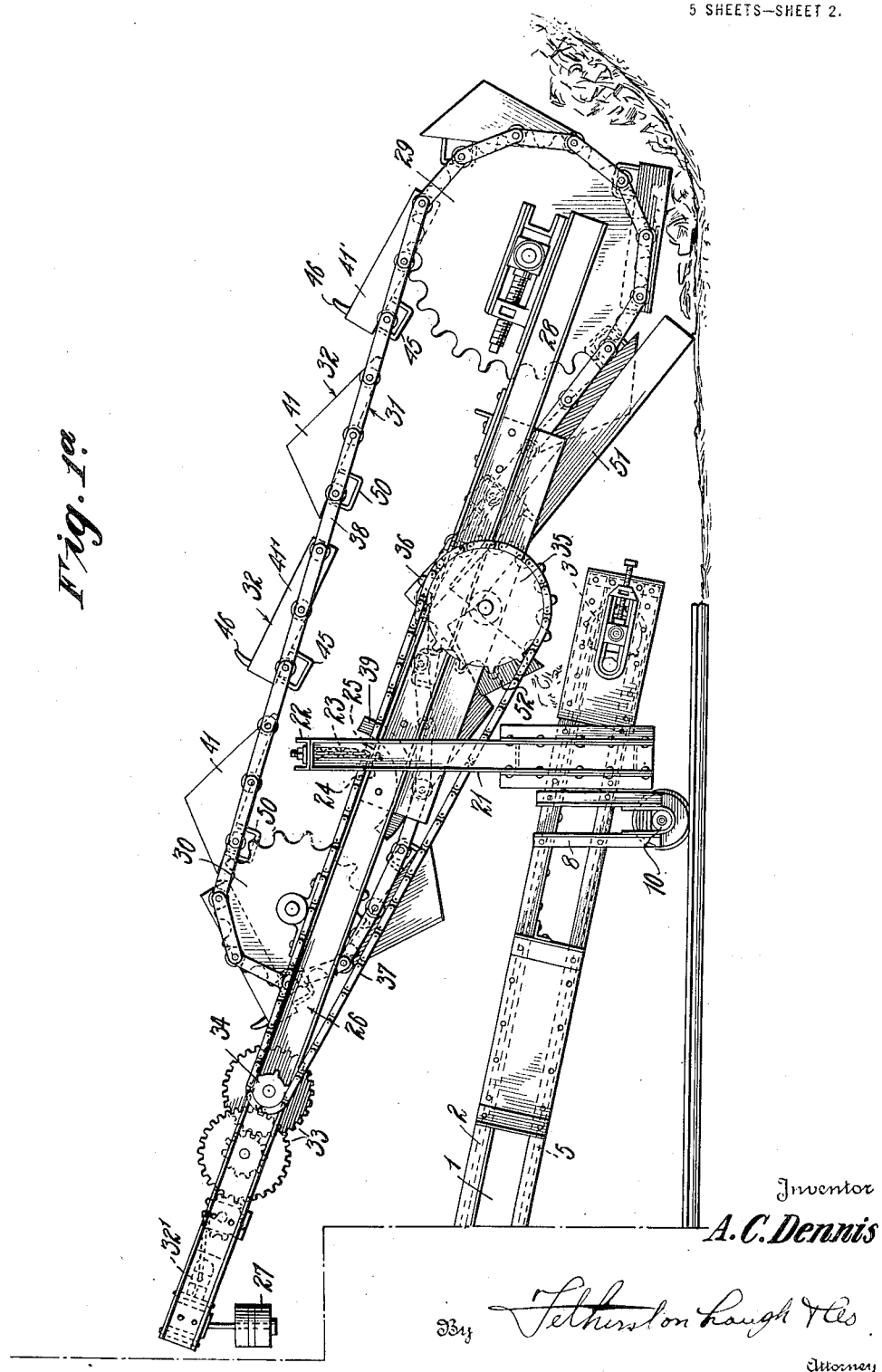

A. C. DENNIS.
MATERIAL LOADING MACHINE.
APPLICATION FILED APR. 7, 1920.

1,398,365.

Patented Nov. 29, 1921.
5 SHEETS—SHEET 4.

Inventor
A. C. Dennis

By Thurston Laugh & Co.
Attorney

A. C. DENNIS.
MATERIAL LOADING MACHINE.
APPLICATION FILED APR. 7, 1920.

1,398,365.

Patented Nov. 29, 1921.
5 SHEETS—SHEET 5.

Inventor
A. C. Dennis.
By Featherstonhaugh & Co
Attorney

UNITED STATES PATENT OFFICE.

ARTHUR C. DENNIS, OF SEATTLE, WASHINGTON.

MATERIAL-LOADING MACHINE.

1,398,365.  Specification of Letters Patent.  Patented Nov. 29, 1921.

Application filed April 7, 1920. Serial No. 372,040.

*To all whom it may concern:*

Be it known that I, ARTHUR CRISFIELD DENNIS, residing at Seattle, in the county of King and State of Washington, have invented new and useful Improvements in Material-Loading Machines, of which the following is a specification.

This invention relates to machines of the excavating type. More specifically it is directed to an apparatus for collecting and conveying to a desired place loose material, such as broken stone, coal, ore, and the like.

One object of this invention is the provision of a highly efficient, durable and convenient machine for use in tunnels, mines, and other low and confined places, to collect the loose material after it has been broken up by the blast, and convey such material back to loading cars situated to the rear of the machine by which it is removed from the tunnel, mine, drift, or other excavation.

Another object of this invention is to design a machine by which the loose material is gathered into a trough, caused to ascend the latter, and subsequently discharged through a chute onto an endless conveyer by which it is transferred to and deposited in suitable mining cars.

A further object is to provide a mobile excavating outfit having a boom suspension enabling manual adjustment in a horizontal and vertical plane to meet the requirements of the work.

Other objects of this invention are to design a machine which eliminates the load stresses due to the weight of the collected material; to materially reduce the number of parts ordinarily required for machines of this character; to provide a machine substantially self-regulating and capable of being controlled by a single operator.

With these and other objects in view my invention consists in certain novel details of construction and combination and arrangement of parts, to be more specifically hereinafter set forth and claimed.

Heretofore in mining operations it has been the practice, especially in tunnels, drifts, and the like, where the space is extremely limited, to remove the broken rock, ore, and similar material, by manual labor, since mechanical means, which under different circumstances might be employed, cannot be utilized owing to its cumbersome construction and the limited operating area.

Manual removal of the debris of the blast is slow and, manifestly, retards operation of the miners and other operators to such an extent as to materially increase the cost of production. Moreover, because of the time required for the manual removal of this loose material, which is always located directly behind the miners, the gases ensuing from the blast and confined in the interstices between the loose material contaminates the air and not infrequently produces much physical inconvenience to the operator. All of these difficulties would, to a large extent, be remedied if the material were removed from the tunnel as soon as possible.

It is, therefore, the purpose of this invention to provide a compact, mobile, material-collecting device designed to travel on the narrow gage mine tracks, which may be quickly brought to the scene of operation and effectively employed to collect and remove the loose material as it accumulates on the tunnel floor.

Figure 1 is a fragmentary side elevation of the conveyer for transferring the collected material to the mining car, which is shown in dotted outlines.

Fig. 1ª is a fragmentary side elevation of the conveyer and mechanism for collecting and discharging the collected material on to the conveyer.

Fig. 2 is a fragmentary top plan of material collector and conveyer.

Fig. 5 is a detailed perspective view of the hoe.

Fig. 6 is a similar view of the scoop.

Figure 3:
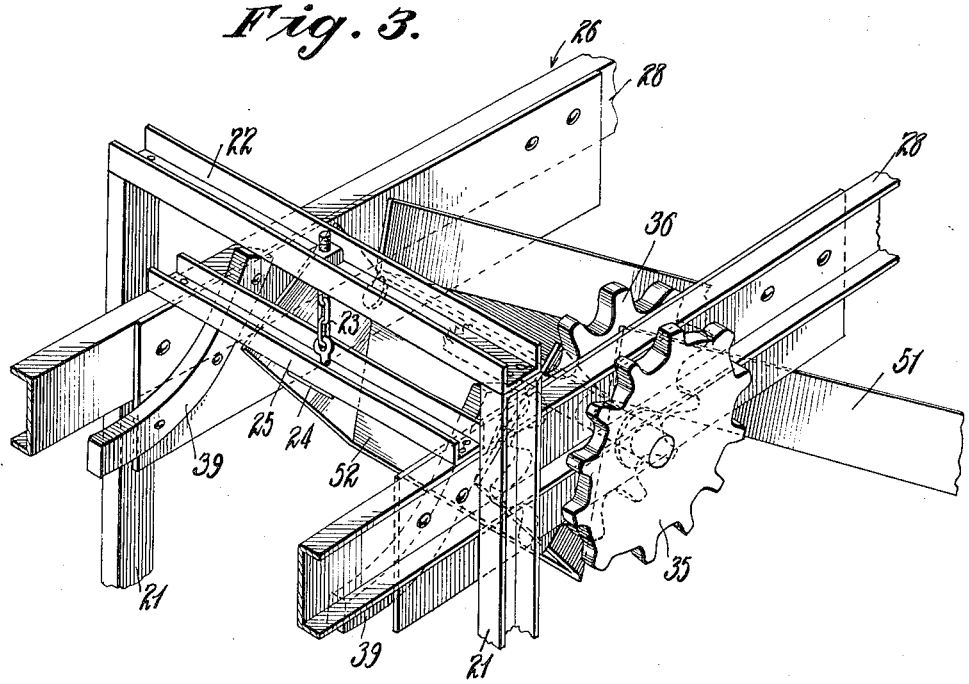
Fig. 3 is a fragmentary detailed perspective view illustrating the boom suspension means, the discharge end of the material receiving trough, and guides for the endless carrier.
Figure 4:
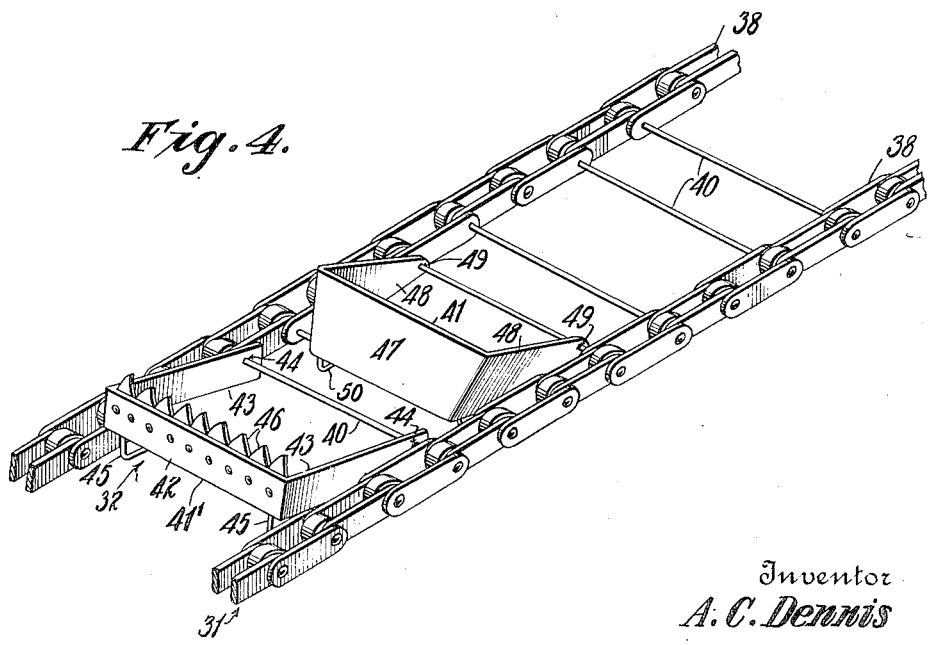
Fig. 4 is a fragmentary detailed perspective view illustrating the scoop, hoe, and carrier assembly.

Briefly stated, this invention comprises a mobile conveyer frame, housing a suitably operated endless conveyer, a counter-balanced boom suspended from uprights attached to the conveyer frame, endless carriers traveling longitudinal of the boom, excavating elements supported by the carriers, and an inclined trough coöperating with the excavating elements and terminating at its upper end in a chute located above the lower stretch of the conveyer.

As a prelude to this invention, it may be stated that the discussion which follows will be sub-divided into the following units, namely:—conveyer, boom suspension, boom, and material collecting mechanism, to be referred to in the order specified. It is also to be understood that this invention contemplates a machine of such small dimensions as will successfully operate in the ordinary mining drift or tunnel.

*Conveyer Unit.*—To convey the material from the collecting mechanism to the loading cars, which are situated to the rear of the machine, it is proposed by this invention to use a conventional form of conveyer, supported in an inclined plane upon suitable trucks designed for travel on the narrow gage tracks used in mining operations.

Although any appropriate conveyer structure might well be employed, for descriptive purposes there is shown one embodiment involving a frame 1 composed of parallel channel irons 2 mounting conveyer gears 3 and 4 at its extremities, over which there travels a conveyer 5, the latter being in the nature of a pair of parallel sprocket chains 6 provided with intermediate slat-like mengers 7.

Conveyer 5 is supported by standards 8 and 9 attached to the front and rear trucks 10 and 11. These standards are of such a length that, when properly positioned, the conveyer frame will be disposed in an inclined plane to permit a mining car or like vehicle to be run beneath its discharging end and receive the collected material as it leaves the upper end of the conveyer.

A motor supporting platform 12, suitably braced at its outermost end, extends forwardly from standards 9 and mounts a motor 13, functioning as an operating means for conveyer 5 through the medium of intermeshing gears 14, sprocket gears 15, 16, 17 and 18 and sprocket chains 19 and 20.

*Boom suspension.*—To effect manual adjustment of the boom, it is absolutely essential that the latter be accurately balanced and properly counterweighted to offset the weight of its active or excavating end. This is obtained by providing the lowermost extremity of conveyer frame 1 with standards 21, the upper ends of which are interconnected by a cross-head 22, from the central portion of which depends a suspension chain 23.

The free extremity of this chain 23 engages anchoring plate 24 mounted on a cross-piece 25 positioned transverse of the boom 26, as clearly shown in Fig. 3 of the drawings.

This arrangement affords a single point suspension, which, acting in conjunction with suitable counterweights 27, arranged at the extreme upper end of the boom, enables the latter to be readily adjusted either horizontally or vertically according to the condition of the work.

*Boom.*—The boom used in connection with this invention is of an extremely simple design and comprises in its present form suitably reinforced parallel channel irons 28 mounting a pair of large carrier sprockets 29 at its lower or excavating end and a similar pair of carrier gears 30 positioned near its upper end, these gears being designed to accommodate endless carriers 31, which support and simultaneously operate excavating elements 32.

In one form of drive for the carriers 31 shown in Fig. 1ª, a motor 32' is mounted on the boom adjacent its upper end. And in this connection it is to be understood that while in the present form a motor of the pneumatic type is shown, any appropriate driving means might be employed. The motor 32' is drivingly connected to carriers 31 through the instrumentality of intermeshing gears 33, sprockets 34, 35 and 36, over which are trained sprocket chains 37 and 38.

The sprockets 36, which are journaled beneath and central of boom 21, in addition to functioning as driving means for the carriers, also serve to guide the lower stretch of the carrier so that as the excavating elements ascend the trough, hereinafter to be mentioned, they will be disposed so as to properly clear the upper end of said trough and completely discharge their contents.

If desirable, arcuate guiding plates 39 may be secured to the sides of the boom to coöperate with the driving sprockets 36 and properly direct the carriers around their sprockets 30.

Figure 7:
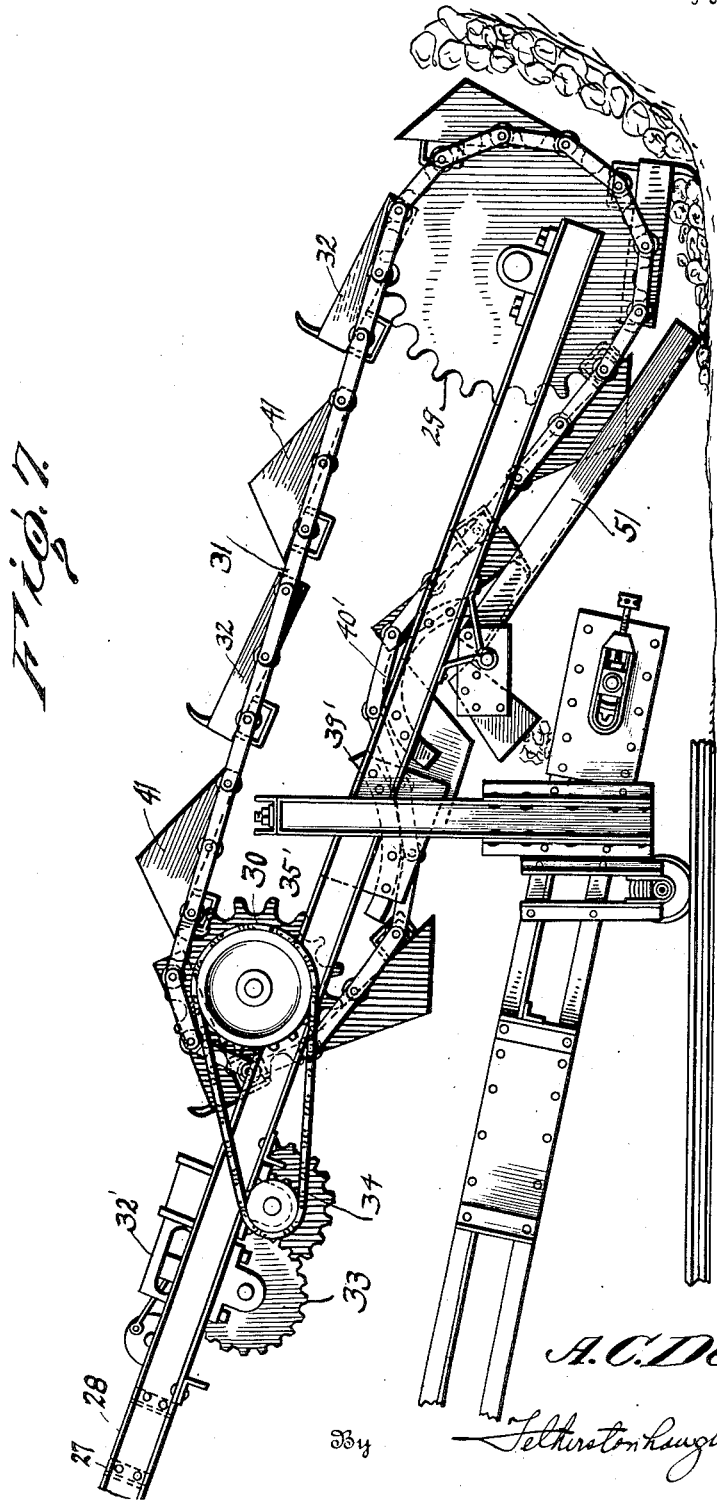
Fig. 7 is a fragmentary side elevation of a slightly modified form of the conveyer and mechanism for collecting and discharging the collected material on to the conveyer.

In the design shown in Fig. 7, carriers 31 are actuated by gears 30. The shaft of these gears is extended on one side of the boom frame and provided with a driving sprocket 35'. The sprocket chain, trained over gears 34 and 35', transmit the drive of the motor 32 to carriers 31. As the carriers 31 in this construction are driven by gears 35', the central gear, illustrated in Fig. 1ª as a driving means, is dispensed with.

With the exception of counterweights 27, which are positioned between the frames of the boom instead of depending therefrom, and the complemental guides 39 and 40 for directing the course of carriers 31 above the upper end of the trough, hereinafter to be referred to, the construction details of the boom illustrated in Fig. 7 are substantially the same as those shown and described in connection with Fig. 1ª, and consequently further discussion with respect thereto is thought to be unnecessary.

*Material collecting mechanism.*—The loose material is collected from the floor of the tunnel or like excavation and transferred to the conveyer by means of what has been termed an excavating mechanism, which comprises the carriers with their excavating elements and an inclined trough, up which the excavator elements travel after they have shoveled the material on to the trough, said material being pushed in advance of the excavating elements and discharged on to the conveyer through a discharging chute located at the upper end of the trough.

Carriers 31 are of the roller chain type, interconnected by tie rods 40 to which are secured excavating elements 32, consisting of an alternate series of scoops and hoes 41 and 41', respectively.

Hoes 41' are in the form of a U-shaped frame, having a rear piece 42 and side pieces 43. The side pieces 43 are formed with alining apertures 44 provided with depending loops 45 to accommodate tie rods 32, while to the rear piece 41 are removably secured a plurality of tines 46. The scoops 41 are also U-shaped in design and consist of an inclined rear plate 47 and side pieces 48, which are apertured as at 49 and provided with loops 50 for the purpose specified in connection with hoes 41.

By means of loops 45 and 50 on the hoes and scoops, respectively, they are permitted when passing around the carrier gears of the boom to assume the proper position for gathering the material on to the trough.

To receive the loose material as it is collected by the excavating elements, there is provided a trough 51 corresponding in width to that of the excavating elements. This trough 51 is fastened at its upper end to the boom, about the central portion thereof, and extends downwardly beneath said boom and at an angle thereto, so that as the excavating elements pass around the excavating end of the boom, they will enter the trough 51 and travel upward through the latter to its upper end, at which point they will be suitably disposed by the driving gears or complemental guides to effect a complete discharge of the material. The upper end of trough 51 terminates in a chute 52, disposed so that collected material will be discharged on to the previously mentioned conveyers.

Having set forth the structural details of this invention, its operation would seem to be as follows: Assuming the conveyer, with its boom, to be properly located with respect to the material to be removed, said boom is elevated by the operator until its active or excavating end rests upon the top of the pile, whereupon carrier 31 is set into operation, causing the excavating elements 32 to successively enter the material as their carriers pass around the large gears 29. Upon emerging from the material, each of the excavating elements will have accumulated a certain portion thereof, which is shoveled on to and pushed up the trough in advance of the excavating elements to its upper end, where it is discharged through chute 52 on to the conveyer, by which it is transferred to the loading cars.

Owing to the counterbalanced arrangement of the boom, it will automatically descend from grade to level as the material diminishes. Moreover, should a non-yielding obstacle be encountered, the single point suspension of the boom will permit it to yield before the excavating elements have been damaged. However, owing to the provision of a hoe between each shovel, the material will be loosened to such an extent that likelihood of the material being so compact as to resist entrance of the excavating elements is reduced to a minimum.

In conclusion, while this machine is primarily designed for operation in tunnels, mines and trenches, for loading the loose material, it is evident that it may also be successfully employed for picking up and loading material in any other place, and that where sand and other comparatively loose material such as large piles of coal and the like, is to be handled it can be done by this machine a great deal cheaper and more expediently than by hand labor.

Although in the foregoing description certain elements have been described as best adapted to perform the functions allotted to them, it is to be understood that various minor changes may be resorted to within the scope of the appended claims without departing from or sacrificing any of the principles of this invention.

Having thus described my invention, what I claim as new and desire to secure by Letters Patent is:

1. In a machine of the character described, the combination with a boom suspended intermediate its ends to permit universal movement about the point of suspension, and having a traveling excavating element; of a material receiving member located beneath the boom and over which the excavating element is ascendable.

2. In a machine of the character described, the combination with a boom suspended intermediate its ends to permit universal movement about the point of suspension, and having a traveling excavating element; of a material receiving member located beneath the boom and over which the excavating element is ascendable, said member terminating in a discharge chute.

3. In a machine of the character described, the combination with a boom suspended intermediate its ends to permit universal movement about the point of suspension, and having a series of traveling excavating elements; of a material receiving member located beneath the boom and over which the excavating elements are ascendable, said member terminating in a discharge chute.

4. In a machine of the character described, the combination with a boom suspended intermediate its ends to permit universal movement about the point of suspension, and having a series of traveling excavating elements; of a material receiving member located beneath the boom and over which the excavating elements are ascendable, said member terminating in a discharge chute.

5. In a machine of the character described, the combination with a boom suspended intermediate its ends to permit universal movement about the point of suspension, and having a series of traveling excavating elements; of a material receiving member located beneath the boom and over which the excavating elements are ascendable.

6. In a machine of the character described, the combination with a boom suspended intermediate its ends to permit universal movement about the point of suspension, and having a series of traveling excavating elements; of a material receiving trough located beneath the boom and in angular relation with respect thereto, and over which the excavating elements are ascendable.

7. In a machine of the character described, the combination with a boom suspended intermediate its ends to permit universal movement about the point of suspension, and having a series of traveling excavating elements; of a material receiving trough located in an inclined plane beneath the boom and over which the excavating elements are ascendable, said trough terminating at its upper end in a discharge chute.

8. In a machine of the character described, the combination with a boom suspended intermediate its ends to permit universal movement about the point of suspension, and having a series of traveling excavating elements; of a material receiving trough located in an inclined plane beneath the boom and over which the excavating elements are ascendable, said trough terminating at its upper end in a discharge chute.

9. In a machine of the character described, the combination with a boom suspended intermediate its ends to permit universal movement about the point of suspension, and having a plurality of traveling excavating elements embodying a series of hoes and scoops; of a material receiving member located beneath the boom and over which the excavating elements are ascendable.

10. In a machine of the character described, the combination with a boom suspended intermediate its ends to permit universal movement about the point of suspension, and having a plurality of traveling excavating elements involving a series of hoes and scoops; of a material receiving member located beneath the boom and ascendable by the excavating elements, said member terminating at its upper end in a discharge chute.

11. In a machine of the character described, the combination with a boom suspended intermediate its ends to permit universal movement about the point of suspension, and having a plurality of traveling excavating elements embodying a series of hoes and scoops; of a material receiving trough located in an inclined plane beneath the boom and over which the excavating elements are ascendable, said trough terminating at its upper end in a discharge chute.

12. In a machine of the character described, the combination with a boom suspended intermediate its ends to permit universal movement about the point of suspension, and having a plurality of traveling excavating elements involving an alternate series of hoes and scoops; of a material receiving trough located in an inclined plane beneath the boom adjacent its excavating end and over which the excavating elements are ascendable, said trough terminating at its upper end in a discharge chute.

13. In a machine of the character described, the combination with a boom suspended intermediate its ends to permit universal movement about the point of suspension, and having a plurality of traveling excavating elements embodying an alternate series of hoes and scoops; of a material receiving trough located in an inclined plane adjacent the excavating end of the boom and over which the excavating elements are ascendable, said trough terminating at its upper end in a discharge chute.

14. In a machine of the character described, the combination with a boom suspended intermediate its ends to permit universal movement about the point of suspension, and having a plurality of traveling excavating elements embodying a series of hoes and scoops; of a material receiving trough located in an inclined plane beneath the boom adjacent its excavating end, and over which the excavating elements are ascendable, said trough terminating at its upper end in a discharge chute and a conveyer located beneath the chute to receive the ensuing material.

15. In a machine of the character described, the combination with a boom suspended intermediate its ends to permit universal movement about the point of suspension, and having a plurality of traveling excavating elements embodying a series of hoes and scoops; of a material receiving trough located in an inclined plane beneath the boom adjacent its excavating end and over which the excavating elements are ascendable, said trough terminating at its upper end in a discharge chute and a conveyer disposed beneath the chute to receive the discharging material.

16. In a machine of the character described, the combination with a support and a boom suspended from the support intermediate its ends to permit universal movement about the point of its suspension, having a plurality of traveling excavating elements; of a material receiving trough located in an inclined plane beneath the boom adjacent its excavating end and over which the excavating elements are ascendable, said trough terminating in a discharge chute.

17. In a machine of the character described, the combination with a support and a boom suspended therefrom intermediate its ends to permit universal movement about the point of its suspension; of a plurality of traveling excavating elements mounted on the boom, a trough located in an inclined plane beneath the boom adjacent its end, and over which the excavating elements are ascendable, and a discharge chute positioned at the upper end of the trough.

18. In a machine of the character described, the combination with a support and an approximately counterbalanced boom suspended therefrom intermediate its ends to permit universal movement about the point of its suspension; of a plurality of traveling excavating elements mounted on the boom, a trough located in an inclined plane beneath the boom adjacent its excavating end and over which the excavating elements are ascendable, said trough terminating in a discharge chute.

19. In a machine of the character described, the combination with a horizontal support and an approximately counterbalanced boom suspended from the central portion thereof and intermediate its ends to permit universal movement about the point of its suspension; of a plurality of traveling excavating elements mounted on the boom, a trough located in an inclined plane beneath the boom adjacent its excavating end and over which the excavating elements are ascendable, said trough terminating in a discharge chute.

20. In a machine of the character described, the combination with a truck mounted conveyer, disposed in an inclined plane and provided with uprights at its lower extremity; of a boom suspended from the uprights intermediate its ends and universally adjustable about the point of its suspension; a plurality of traveling excavating elements mounted on the boom, a trough located in an inclined plane beneath the boom adjacent its excavating end and over which the excavating elements are ascendable and a chute located at the upper end of the trough above the conveyer to discharge collected material thereon.

21. In a machine of the character described, the combination with a truck mounted conveyer disposed in an inclined plane and having a pair of parallel uprights secured to its lower end; of a cross-piece joining the extremities of the uprights, a boom suspended from the central portion of said cross-piece, means to effect approximate counterbalancing of the suspended boom, a plurality of traveling excavating elements mounted on the boom, a material receiving trough located in an inclined plane beneath the boom adjacent its excavating end and over which the excavating elements are ascendable, and a discharge chute disposed at the upper end of the trough above the conveyer to discharge the collected material thereon.

ARTHUR C. DENNIS.